US012101297B2

(12) United States Patent
Purta

(10) Patent No.: US 12,101,297 B2
(45) Date of Patent: Sep. 24, 2024

(54) NETWORK CONFIGURATION FOR ROUTING OF DATA, AND RELATED SYSTEMS AND METHODS

(71) Applicant: Cyber Intell Solution, LLC, Gambrills, MD (US)

(72) Inventor: Alexander Purta, Gambrills, MD (US)

(73) Assignee: Rowan Holding, LLC, Gambrills, MD (US)

( * ) Notice: Subject to any disclaimer, the term of this patent is extended or adjusted under 35 U.S.C. 154(b) by 426 days.

(21) Appl. No.: 17/465,416

(22) Filed: Sep. 2, 2021

(65) Prior Publication Data

US 2022/0417218 A1      Dec. 29, 2022

Related U.S. Application Data

(60) Provisional application No. 63/215,645, filed on Jun. 28, 2021.

(51) Int. Cl.
*H04L 9/40*        (2022.01)

(52) U.S. Cl.
CPC ...... *H04L 63/0272* (2013.01); *H04L 63/0236* (2013.01); *H04L 63/029* (2013.01); *H04L 63/0414* (2013.01); *H04L 63/0435* (2013.01); *H04L 63/0823* (2013.01)

(58) Field of Classification Search
CPC ............ H04L 63/0272; H04L 63/0236; H04L 63/029; H04L 63/0414; H04L 63/0435; H04L 63/0823; H04L 63/0428
USPC ........................................................ 726/15
See application file for complete search history.

(56) References Cited

U.S. PATENT DOCUMENTS

| | | | |
|---|---|---|---|
| 11,310,146 B1 * | 4/2022 | Kaciulis | H04L 63/0428 |
| 11,356,419 B1 * | 6/2022 | Nosalis | G06F 16/245 |

* cited by examiner

*Primary Examiner* — Bryan F Wright
(74) *Attorney, Agent, or Firm* — Lieberman & Brandsdorfer, LLC

(57) ABSTRACT

A computer system and method designed to support and enable a dual obfuscated virtual private network (VPN) for routing data. A plurality of servers is configured with hardware elements in a hardware layer, and an operatively coupled operating system layer with a first virtual private server (VPS) operatively coupled to a second VPS. The first VPS is configured to generate an OpenVPN certificate and the second VPS is configured to generate a WireGuard certificate. Communication tunnels encrypted with a combination of OpenVPN and WireGuard are created to establish the dual obfuscated VPN to support data encryption.

35 Claims, 9 Drawing Sheets

NETWORK CONFIGURATION FOR ROUTING OF DATA, AND RELATED SYSTEMS AND METHODS

CROSS REFERENCE TO RELATED APPLICATION(S)

This application claims the benefit of priority to U.S. Provisional Application No. 63/215,645 filed in the U.S. Patent and Trademark Office on Jun. 28, 2021, titled "A Dual Obfuscated Computer Network, and Related Systems and Methods", the complete disclosure of which is incorporated herein by reference.

BACKGROUND

The present embodiments relate to an encrypted dynamic network infrastructure. More specifically, the embodiments relate to encryption protocols and leveraging the protocols with respect to data and network connections.

An internet protocol (IP) address is a unique address that identifies a device on a public or local network. Every packet of data traversing an IP network contains a source IP address, to indicate an originating or source location, and a destination IP address, to indicate a target location. A virtual private network (VPN) is a private network configured within a public network, e.g. a less secure network, effectively creating a private tunnel through the public network. The VPN provides a server between a client machine with a source location and corresponding source IP address and a destination location with the corresponding destination IP address, so that the destination location only sees the IP address of the VPN and not the source location IP address. Accordingly, VPNs can be used to hide the IP address, geographical location, web activity, or devices being used.

Cyberwarfare is recognized in the art as a computer or network based conflict involving attempts or attacks to disrupt activity. Examples of cyberwarfare include, but are not limited to, viruses, denial of service attacks, hacking and theft of data, and ransomware. Data at rest and data in transit are both susceptible to intercept and manipulation. Cybersecurity, also referred to herein as information technology (IT) security, refers to a body of technologies, processes, and practices designed to protect networks, devices, programs, and data from unauthorized attacks associated with cyberwarfare. It is recognized that the volume and sophistication of cyberattacks are growing and evolving over time. Accordingly, IT security needs to expand and adapt to the evolving nature of cyberattacks to mitigate, if not prevent, the effects of such cyberattacks.

SUMMARY

The embodiments include a system, computer program product, and methods for creating and supporting a dual obfuscated network. This Summary is provided to introduce a selection of representative concepts in a simplified form that are further described below in the Detail Description. This Summary is not intended to identify key features or essential features of the claimed subject matter, nor is it intended to be used in any way that would limit the scope of the claimed subject matter.

In an aspect, a computer system is provided with a first server having a hardware layer, provided with one or more hardware resources, and an operatively coupled operating system (OS) layer. The OS layer include a first virtual private server (VPS) and an operatively coupled second VPS. The first VPS is configured with OpenVPN protocol, which is further configured to generate an OpenVPN certificate and to support a first communication tunnel from a secondary source. The second VPS is operatively coupled to the first VPS via a private internet protocol (IP) scheme. The second VPS is configured with WireGuard protocol, which is further configured to generate a WireGuard certificate. Using the WireGuard protocol, the second VPS is configured to spawn a second communication tunnel encrypted with the WireGuard protocol. The first server is configured to receive a communication from a secondary device to initiate a virtual private network (VPN) connection. The received communication is configured to initiate the first communication tunnel to the first VPS, with the first VPS configured to forward the received communication to the second VPS on a first private IP scheme, and the second VPS is configured to initiate the second communication tunnel to a second server on a second private IP scheme different from the first private IP scheme.

In another aspect, a computer program product is provided with a plurality of servers, including a first server operatively coupled to a second server and a third server. Each of the first, second, and third servers having a hardware layer with one or more hardware resources and an operatively coupled operating system (OS) layer. In addition, the server operating system layer is configured with a first virtual private server (VPS), and an operatively coupled second VPS. The first VPS is configured with OpenVPN protocol to generate an OpenVPN certificate and to support a first communication tunnel with a secondary source, with the first communication tunnel encrypted with the OpenVPN protocol. The second VPS is operatively coupled to the first VPS via a private internet protocol (IP) scheme. The second VPS is configured with WireGuard protocol to generate a WireGuard certificate, and configured to spawn a second communication tunnel encrypted with the WireGuard protocol. The first server is configured to receive a communication from a secondary source to initiate a virtual private network connection. The received communication is configured to initiate the first communication tunnel to the first VPS, and the first VPS is configured to forward the received communication to the second VPS on a first private IP scheme. The second VPS is configured to initiate the second communication tunnel to one of the second and third servers on a second private IP scheme different from the first private IP scheme.

In yet another aspect, a method is provided to support a dual obfuscated computer network. A first server is provided with a hardware layer with one or more hardware resources and an operating system (OS) layer. The operating system layer operatively is provided with a first virtual private server (VPS) and an operatively coupled second VPS. The first VPS is configured with OpenVPN protocol configured to generate an OpenVPN certificate and to support a first communication tunnel with a secondary source. The first communication tunnel is encrypted with the OpenVPN protocol. The second VPS is operatively coupled to the first VPS via a private internet protocol (IP) scheme. The second VPN server is configured with WireGuard protocol configured to generate a WireGuard certificate, and is further configured to spawn a second communication tunnel encrypted with the WireGuard protocol. Following receipt of a communication from a secondary source initiating a virtual private network (VPN) connection, the first VPS forwards the received communication to the second VPS on a first private IP scheme, and the second VPS initiates the second communication tunnel to a second server on a second private IP scheme different from the first private IP scheme.

In a further aspect, a computer implemented method is provided to support and enable a dual obfuscated computer network. At least three servers, referred to as a first server, a second server, and a third server, are operatively coupled. Each of the first, second, and third servers is configured with a hardware layer with one or more hardware resources and an operatively coupled operating system (OS) layer. The OS layer of each of the servers is configured with a first virtual private server (VPS) and a second VPS. The first VPS is configured with OpenVPN protocol and is further configured to generate an OpenVPN certificate and to support a first communication tunnel with a secondary source. The first communication tunnel is encrypted with the OpenVPN protocol. The second VPS is operatively coupled to the first VPS via a private internet protocol (IP) scheme. The second VPS is configured with WireGuard protocol and is further configured to generate a WireGuard certificate. The second VPS is configured to spawn a second communication tunnel encrypted with the WireGuard protocol. A private network connection is established by initiating the first communication tunnel to the first VPS, the first VPS forwarding the received communication to the second VPS on a first private IP scheme, and the second VPS initiating the second communication tunnel to one of the second and third servers on a second private IP scheme different from the first private IP scheme.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings reference herein form a part of the specification, and are incorporated herein by reference. Features shown in the drawings are meant as illustrative of only some embodiments, and not of all embodiments, unless otherwise explicitly indicated.

DETAILED DESCRIPTION

It will be readily understood that the components of the present embodiments, as generally described and illustrated in the Figures herein, may be arranged and designed in a wide variety of different configurations. Thus, the following detailed description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Data in transit, which is also referred to herein as data in motion, is data actively moving from one location to another location across a network connection, either a public network, such as the Internet, or a private network. It is understood in the art that protection of data may be desirable for various reasons, including but not limited to, confidentiality and security concerns. Data protection in transit is directed at protection of data between a source location and a target location. Examples of data transit include, but are not limited to, data traveling across networks and data transfer from a local storage device to a remote storage device. Regardless of the form of direction of data transit, effective measures are required to protect such data from any form of security breach or tampering.

The VPN is a tool to protect data in transit by providing privacy and anonymity through creating a private network within a public network. As shown and described herein, multiple VPNs are utilized to create one or more encrypted tunnels, also referred to herein as tunnels, between a source location and a target location. The use of the VPN includes masking the IP address thereby mitigating tracing of the data transit. As shown and described herein, configuration of a VPN is provided to support and enhance data encryption.

Figure 1:
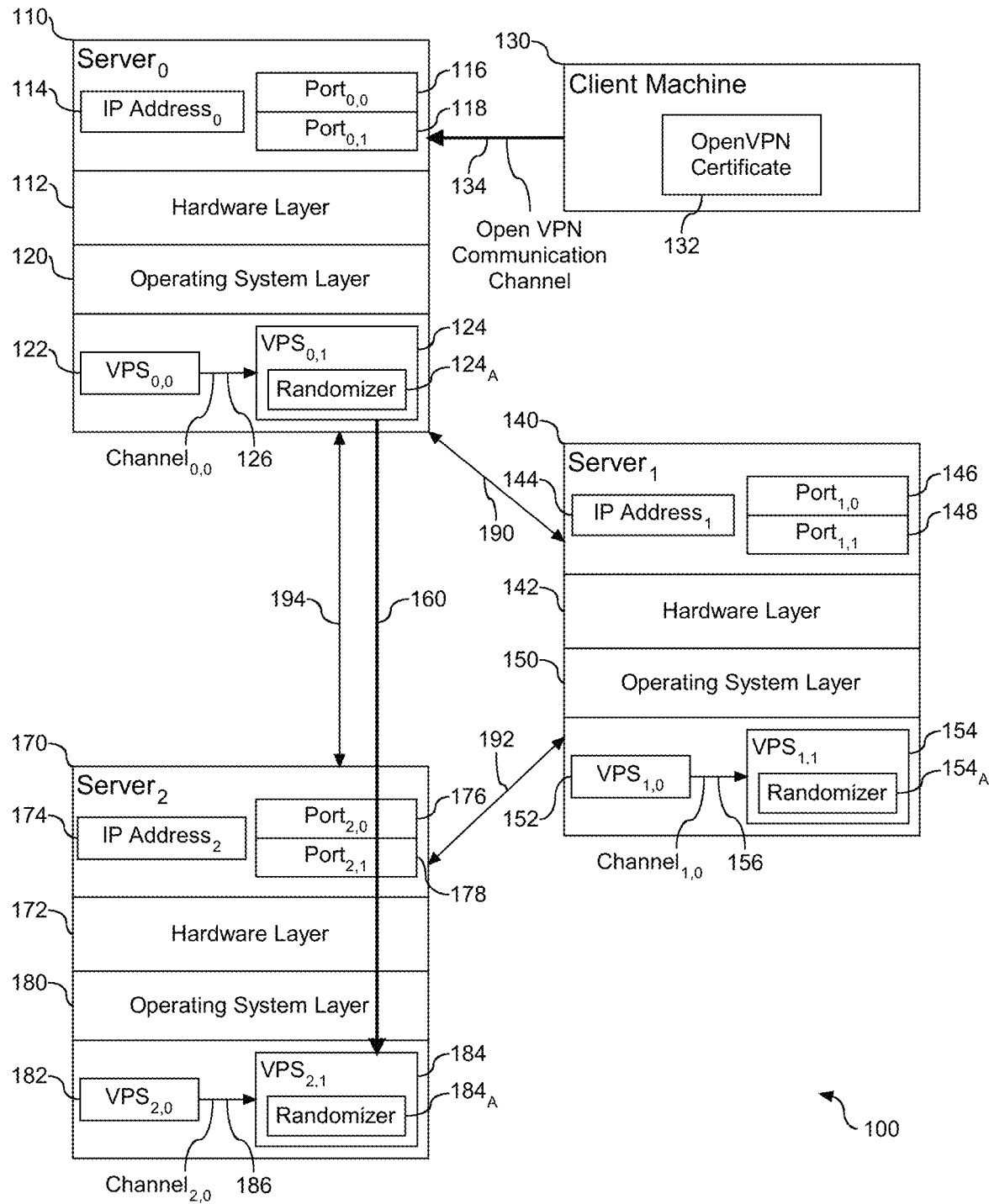
FIG. 1 illustrates a schematic diagram of a computer system to support and enable data encryption and routing of data through the use of one or more VPNs.

Referring to FIG. 1, a schematic diagram (100) of a computer system to support and enable data encryption and routing of data through the use of one or more VPNs is shown. The diagram (100) illustrates multiple servers to support and enable data encryption and routing of data through the use of one or more VPNs. In an exemplary embodiment, the system employs three server machines, hereinafter referred to individually as a server. By way of example, the servers are shown herein as server$_0$ (110), server$_1$ (140), and server$_2$ (170). Each of the servers is configured with a hardware layer (112), (142), and (172), respectively, and an operating system layer (120), (150), and (180), respectively. Each hardware layer includes a processor, also referred to herein as a processing unit, operatively coupled to memory. In an exemplary embodiment, the hardware layers are configured with 4 virtual core (Vcore) processing, 16 GB of random access memory (RAM), 80 GB solid state drive (SSD), and 3 terabytes (TB) bandwidth. In an embodiment, each operating system layer is provided with Ubuntu, e.g. an open source operating system on Linux.

An internet protocol (IPv4) address is a numeric label, or in an embodiment an alphanumeric label (IPv6), assigned to each computer and other device connected to a computer network that uses internet protocol for communication. This address allows these devices to send and receive data over the internet. Every device that is capable of connecting to the internet has a unique IP address. Transmission control protocol/internet protocol (TCP/IP) is a suite of communication protocols used to connect hosts on the Internet and transmit data. In TCP/IP, a port is an endpoint to a logical connection and the way a client program specifies a specific server program on a computer network. Each of the servers (110), (140), and (170) has a public IP address, shown herein as IP address$_0$ (114), IP address$_1$ (144), and IP address$_2$ (174). In addition, each of the servers (110), (140), and (170) is configured with network ports in the form of numbered addresses to direct network traffic, with each port being a numbered address used to facilitate and direct network traffic. Port numbers range from 0 to 65535, with the port number identifying a port type. As shown herein, the servers (110), (140), and (170) are each configured with two open ports that are externally visible, and all other ports are closed or otherwise unavailable to support and enable network traffic. The open ports of server$_0$ (110) are shown herein as port$_{0,0}$ (116) and port$_{0,1}$ (118), the open ports of server$_1$ (140) are shown herein as port$_{1,0}$ (146) and port$_{1,1}$ (148), and the open ports of server$_2$ (170) are shown herein as port$_{2,0}$ (176) and port$_{2,1}$ (178). In an exemplary embodiment, the open ports are port 443 and port 1999. Port 443 is a well-known dedicated port for all secured hypertext transfer protocol (HTTPS) traffic which masquerades well known VPN ports 400, 4500, 1194, 51820. The art of configuring the VPN connection over port 443, as shown and described herein, is to ensure that the port it is not ever blocked, considering that blocking port 443 would equate blocking the internet connection. Port 1999 is a random port that is utilized to masquerade well know port 22 for a secure shell connection (SSH) in order to obfuscate SSH signature, while having secure access to a VPS server for configurations of a network, or in an exemplary embodiment a proprietary network. In the embodiment shown herein, port$_{0,0}$ (116) and port$_{0,1}$ (118) are ports 443 and 1999, respectively, port$_{1,0}$ (146) and port$_{1,1}$ (148) are ports 443 and 1999, respectively, and port$_{2,0}$ (176) and port$_{2,1}$ (178) are ports 443 and 1999, respectively. In an embodiment, different port numbers may be assigned to the open server ports.

Each of the OS layers (120), (150), and (180), is configured with two virtual private servers (VPS). A VPS is a server created using software virtualization. The VPS functions like a physical server, but is a virtualized instance within a physical server. As shown herein, server$_0$ (110) is shown with VPS$_{0,0}$ (122) and VPS$_{0,1}$ (124), server$_1$ (140) is shown with VPS$_{1,0}$ (152) and VPS$_{1,1}$ (154), and server$_2$ (170) is shown with VPS$_{2,0}$ (182) and VPS$_{2,1}$ (184). Within each of the physical servers, the respective VPS's are operatively coupled. As shown herein, VPS$_{0,0}$ (122) is operatively coupled to VPS$_{0,1}$ (124) across tunnel$_{0,0}$ (126), VPS$_{1,0}$ (152) is operatively coupled to VPS$_{1,1}$ (154) across tunnel$_{1,0}$ (156), and VPS$_{2,0}$ (182) is operatively coupled to VPS$_{2,1}$ (184) across tunnel$_{2,0}$ (186). In an exemplary embodiment, tunnel$_{0,0}$ (126), tunnel$_{1,0}$ (156), and tunnel$_{2,0}$ (186), are each separate uni-directional communication tunnels through a private IP scheme.

Each VPS (122), (152), and (182) is individually designated as an entry VPS, or in an embodiment an exit VPS, and each VPS (124), (154), and (184) is individually designated as an exit VPS. In an exemplary embodiment, each entry VPS (122), (152), and (182) is visible to external sources and is configured with an open-source virtual private network (OpenVPN) protocol to create secure point-to-point connections. In an embodiment, each entry VPS (122), (152), and (182) are individually referred to as an OpenVPN VPS. The OpenVPN protocol and corresponding OpenVPN certificate (not shown) provides a secure tunnel, also referred to herein as a communication tunnel, between two elements in a network to ensure sent data is encrypted and private. Each exit VPS (124), (154), and (184) is configured with a WireGuard communication protocol. In an embodiment, each exit VPS (124), (154), and (184) are individually referred to as a WireGuard VPS. Each exit VPS (124), (154), and (184) is not visible to external sources. The internal communication tunnels across the respective VPSs, e.g. tunnel$_{0,0}$ (126), tunnel$_{1,0}$ (156), and tunnel$_{2,0}$ (186), separately functions as a uni-lateral connection from an OpenVPN protocol of VPS (122), (152), and (182) to a WireGuard protocol of VPS (124), (154), and (184), respectively. In addition, each VPS (124), (154), and (184) is provided with a randomizer application, shown herein as (124$_A$), (154$_A$), and (184$_A$), respectively. Details of the functionality of the respective randomizer applications are described in detail below.

When the entry server is identified or selected, a connection between a secondary device, also referred to herein interchangeably as a client machine, and the entry server is established through the server public IP. In the example of server$_0$ (110) being identified or selected as the entry server, also referred to herein as a command and control server, connection from the client machine to the entry server is established via the public IP address (114). The connection between the client machine and the entry server is through installation of an Open VPN certificate (132) on the client machine (130), thereby establishing an OpenVPN communication tunnel (134) from the client machine to the entry server. In an exemplary embodiment, the communication tunnel is uni-directionally configured to transmit data from the client machine to server$_0$ (110). Details of the communication tunnels with the client machine are shown and described in FIG. 2.

Once the entry server to the network is established, the VPS configured with the WireGuard protocol of the entry server establishes connectivity to all the other servers in the network, which in an embodiment are referred to as transit servers. For example, if server$_0$ (110) is established as the entry server, VPS (124) establishes connectivity to all the other servers in the network, e.g. transit servers, (140) and (170). The connectivity between server$_0$ (110) and server$_1$ (140) is shown at (190), the connectivity between server$_1$ (140) and server$_2$ (170) is shown at (192), and the connectivity between server$_0$ (110) and server$_2$ (170) is shown at (194). Each of the connections (190), (192), and (194) is a bi-directional communication tunnel employing the WireGuard protocol. In an embodiment, the transit servers (140) and (170) communicate bi-directionally via IP tables rules. Each transit server (140) and (170) has an assigned subnet IP via a configuration file (not shown). The bi-directional traffic is established internally via private IP scheme through port 8080. Port 8080 is not visible from outside and it is the port that the WireGuard servers (124), (154), and (184)

communicate internally between them on the corresponded Subnet IP, also known as 10.80.0.1 to 10.70.0.1. As further shown, a uni-directional tunnel (160) is created in response to designation of server$_2$ (170) as a transit server. In an exemplary embodiment, the randomizer (124$_4$), also referred to herein as a randomization algorithm, in the entry server, e.g. server$_0$ (110), randomizes a path to a transit server VPS, and creates an encrypted uni-directional tunnel, also referred to herein as a tunnel, (160). In the example shown herein the tunnel (160) extends from VPS$_{0,1}$ (124) to VPS$_{2,1}$ (184).

Figure 2:
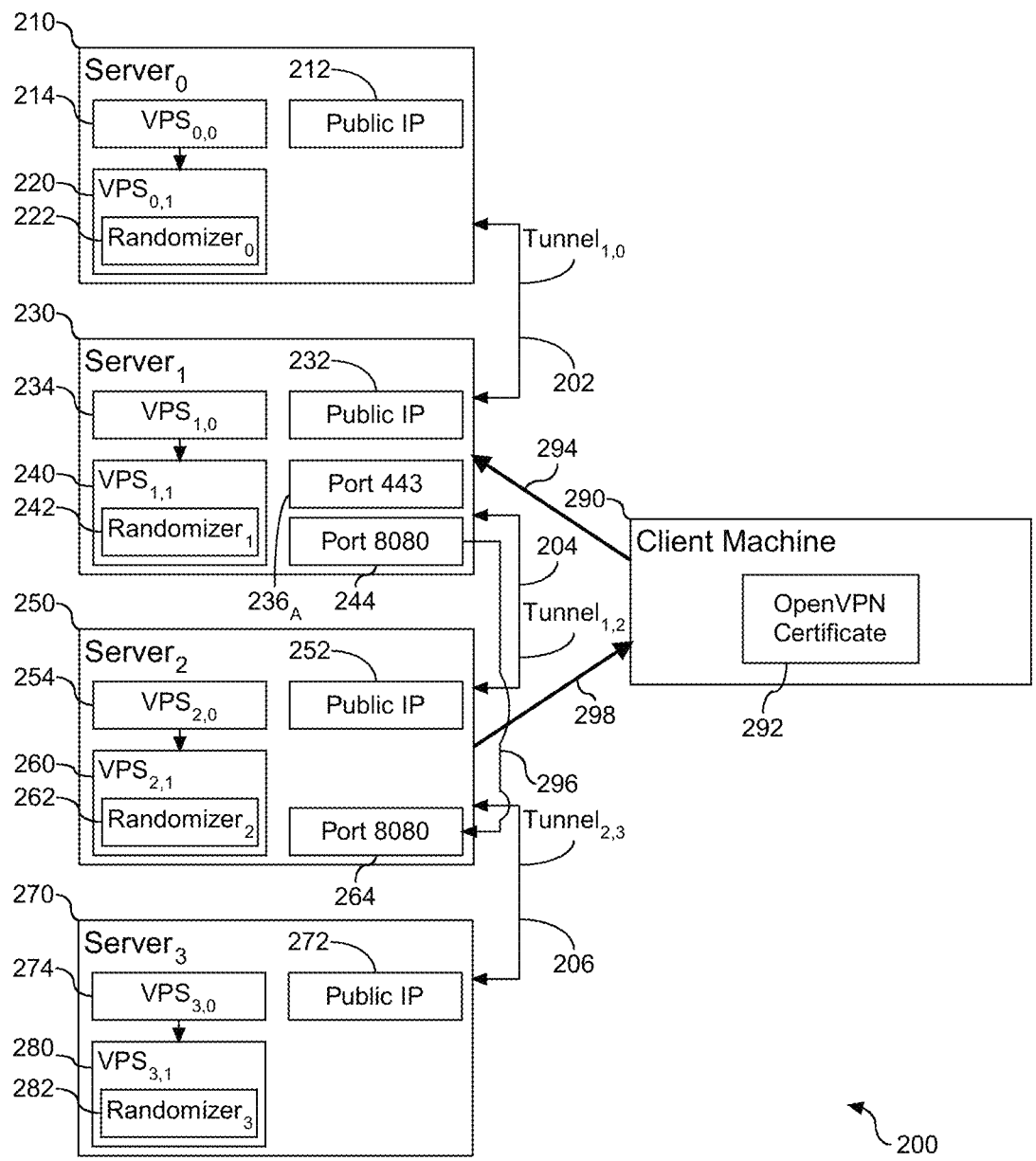
FIG. 2 illustrates a diagram of a computer system configured to support and enable data encryption and routing of data through the use of one or more VPNs, and more specifically to configure a first VPN behind a second VPN.

Referring to FIG. 2, a diagram of a computer system (200) configured to support and enable data encryption and routing of data through the use of one or more VPNs, and more specifically to configure a first VPN behind a second VPN is shown. The computer system (200) is provided with multiple servers operatively coupled to a client machine, with the servers configured to support and enable data encryption and routing of data through the use of one or more VPNs, and more specifically to configure a first VPN behind a second VPN. In the example shown herein there are four servers, including server$_0$ (210), server$_1$ (230), server$_2$ (250), and server$_3$ (270). Although only four servers are shown in this example, the quantity of servers in the network should not be considered limiting. As shown, each server includes a public IP address, shown herein as (212), (232), (252), and (272), respectively. Each of the servers (210), (230), (250), and (270) is configured with only two open network ports to direct network traffic, as shown in FIG. 1, and all other ports are closed or otherwise unavailable to support and enable network traffic. Each server (210), (230), (250), and (270) is similarly configured to the servers shown in FIG. 1, with each server having a hardware layer, as shown in FIG. 1, and an operatively coupled operating system (O/S) layer, with the O/S layer including the first VPS and second VPS, also referred to as the entry VPS and exit VPS, respectively. By way of example, server$_0$ (210) is shown with entry VPS$_{0,0}$ (214) and exit VPS$_{0,1}$ (220), server$_1$ (230) is shown with entry VPS$_{1,0}$ (234) and exit VPS$_{1,1}$ (240), server$_2$ (250) is shown with entry VPS$_{2,0}$ (254) and exit VPS$_{2,1}$ (260), and server$_3$ (270) is shown with entry VPS$_{3,0}$ (274) and exit VPS$_{3,1}$ (280). Each of VPS$_{0,0}$ (214), VPS$_{1,0}$ (234), VPS$_{2,0}$ (254), and VPS$_{3,0}$ (274) is independently and separately visible to external sources and is configured with an OpenVPN protocol to create secure point-to-point connections. Similarly, each of VPS$_{0,1}$ (220), VPS$_{1,1}$ (240), VPS$_{2,1}$ (260), and VPS$_{3,1}$ (280) is individually referred to as an exit VPS, and is configured with a WireGuard protocol. In an exemplary embodiment, each of VPS$_{0,1}$ (220), VPS$_{1,1}$ (240), VPS$_{2,1}$ (260), and VPS$_{3,1}$ (280) are not visible to external sources.

Figure 4:
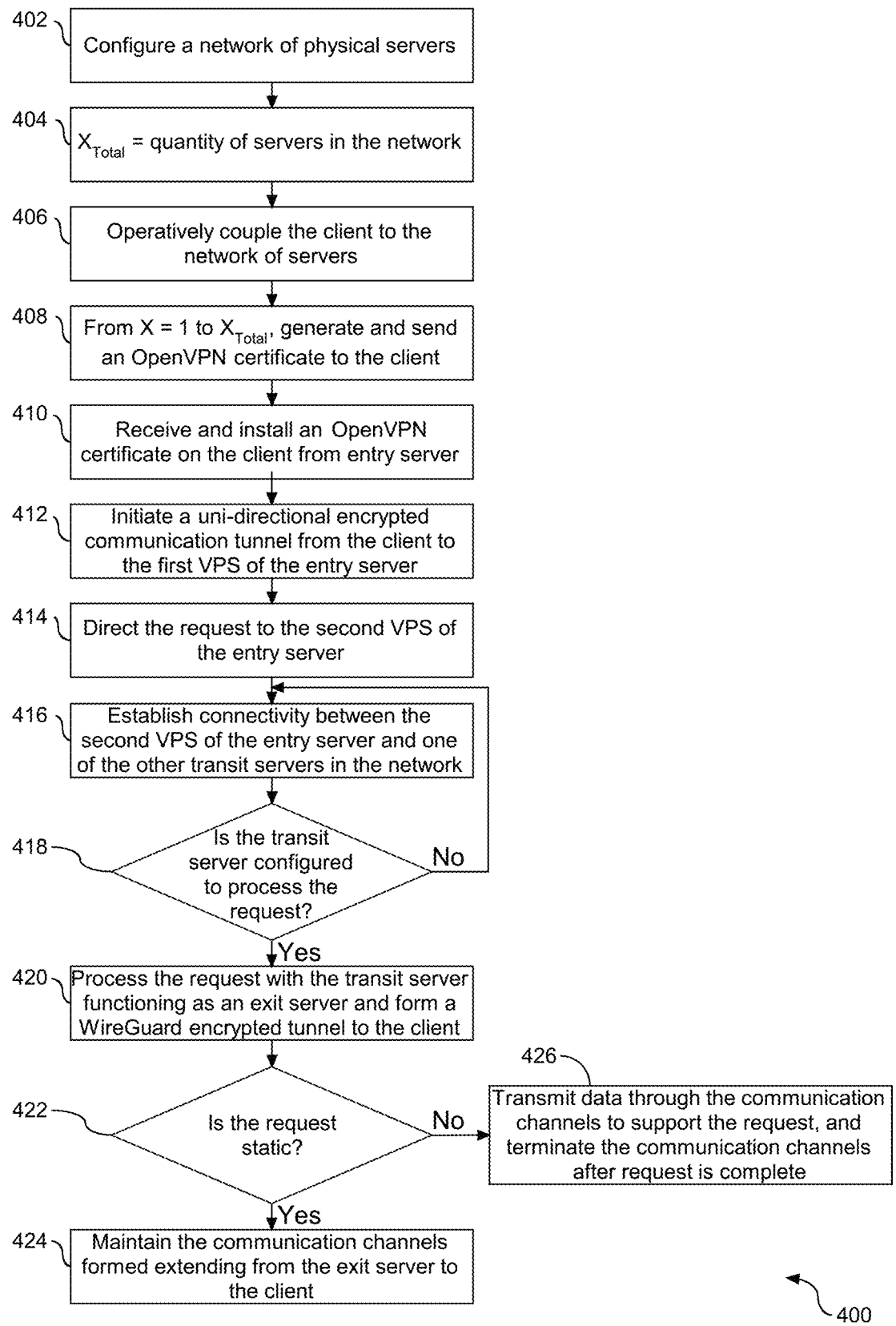
FIG. 4 illustrates a flow chart for configuring a VPN behind a VPS.

As shown and described in FIG. 4, each of the servers in the network, shown herein as (210), (230), (250), and (270) generates and transmits an OpenVPN certificate to an operatively coupled client machine (290), and each received OpenVPN certificate is installed on the client machine (290). To process a request, the client machine (290) selects one of the received and installed OpenVPN certificates, designating an entry server in the network via the certificate selection and initiating a uni-directional communication tunnel encrypted with the OpenVPN protocol. Once the tunnel is created, the client machine (290) sends a request (not shown) to a website on a public network, e.g. Internet. To support the request, the client machine (290) establishes a connection to one of the servers, shown herein as server$_1$ (230), via their public IP address (232). This connection designates server$_1$ (230) as an entry server to support the request. The request is received by port 443 (236$_A$) of server$_1$ (230), which directs the received request to the entry VPS, e.g. VPS$_{1,0}$ (234). The client machine (290) receives and installs an OpenVPN certificate (292) from VPS$_{1,0}$ (234) and creates a communication tunnel, also referred to as a first tunnel, e.g. tunnel$_0$, (294) from the client (290) to the entry server$_1$ (230). In an exemplary embodiment, once the client (290) connects to VPS$_{1,0}$ (234) a setting configuration file within server$_1$ (230) forces all received traffic through a specific DNS, e.g. DNS 1.1.1.1, and does not allow traffic for any other DNS resolution. Accordingly, the first tunnel (294) establishes a uni-directional communication conduit between the client (290) and the entry VPS of a corresponding server.

The exit VPS, e.g. VPS$_{1,1}$ (240), of the entry server, e.g., server$_1$ (230), establishes connectivity in the form of an encrypted WireGuard tunnel to one of the other servers in the network, e.g. (210), 250), and (270). As shown herein, examples of the WireGuard tunnels that may be formed include tunnek$_0$ (202) extending across server$_1$ (230) and server$_0$ (210), tunnel$_{1,2}$ (204) extending across server$_1$ (230) and server$_2$ (250), and tunnel$_{2,3}$ (206) extending across server$_2$ (250) and server$_3$ (270). Each of the WireGuard encrypted tunnels (202), (204), and (206) are bi-directional, and in an exemplary embodiment are permanent tunnels. Each of the servers includes a randomizer, also referred to herein as a randomization algorithm, local to the corresponding exit VPS. As shown, VPS$_{0,1}$ (220) includes randomizer$_0$ (222), VPS$_{1,1}$ (240) includes randomizer$_1$ (242), VPS$_{2,1}$ (260) includes randomizer$_2$ (262), and VPS$_{3,1}$ (280) includes randomizer$_3$ (282). Referring to exit VPS$_{1,1}$ (240), the randomizer$_1$ (242) randomizes selection of a path to a transit server public IP, e.g. (212), (252), and (272). Working in conjunction with the exit VPS$_{1,1}$ (240), the entry server (230) generates an encrypted tunnel to the randomized transit server. In the example shown herein, the tunnel (296) is encrypted with the WireGuard protocol and is limited to uni-directional communication from the entry server$_1$ (230) to the transit server$_2$ (250). In an exemplary embodiment, tunnel (296) extends from VPS$_{1,1}$ (240) to VPS$_{2,1}$ (260) via port 8080 (244) and (264), respectively. A WireGuard VPS of any of the operatively coupled servers is designated or randomly selected, via the operatively coupled randomizer, as the destination of the WireGuard tunnel (296). In an embodiment, a second WireGuard tunnel may be formed with VPS$_{2,1}$ (260) functioning as the source and a designated or randomly selected WireGuard VPS functioning as the destination. Accordingly, one or more WireGuard tunnels may be formed in the VPN configuration.

It is understood that to establish a dual obfuscation network, one of the transit servers, other than the entry server, functions as an exit server to forward data in support of the request to the client machine (290). As shown by way of example, transit server$_2$ (250) may be designated as the exit server. Similarly, in an embodiment, there may be multiple transit servers, with server$_2$ (250) selecting or randomly selecting either server$_0$ (210) and server$_3$ (270) as a subsequent transit server with a corresponding secondary tunnel employing the WireGuard protocol. In an embodiment, a configuration file (not shown) associated with the randomizer will indicate or dictate the quantity of transit nodes to service the client request, and the randomizer will issue a command to the second VPS of the server indicating the designation as an exit server. In the example shown herein, the transit server, server$_2$ (250), is the exit server. Data in support of the client request is obtained, and communicated to the client (290) across a uni-directional WireGuard tunnel (298) from the exit server, e.g. server$_2$ (250). It is understood in the art that the request from the client includes a corresponding header with a destination address of where to find the data. The WireGuard VPS of the exit server leverages the header to form the WireGuard communication tunnel (298) to the client machine (290). Details of servicing the request from the client across the WireGuard tunnel (298) are shown and described in FIG. 4. In an exemplary embodiment, the tunnel (298) is an OpenVPN encrypted tunnel as supported by a corresponding OpenVPN certificate from the exit VPS$_{2,1}$ (254). The management and configuration of the encryption tunnels via WireGuard for intra-server tunnels and via OpenVPN for client-server communication shown and described herein, obfuscates the IP address of the entry server.

In an exemplary embodiment, once the randomizer establishes a connection to a desired transit server, the connection may remain static so that traffic is only generated from that particular IP address. This network of the connections from the client to the entry server, from the entry server to the transit server, and from the transit server to the exit server via the dual VPS configuration, together with the static IP, provides a dual obfuscation network with a static IP. The dual obfuscation is establish with a first uni-directional OpenVPN protocol tunnel (294) from the client (290) to the entry server (230), with the WireGuard protocol tunnel (296) from the entry server (230) to the transit server (250), and with a second uni-directional OpenVPN protocol tunnel (298) from the exit server (250) to the client (290). This network configuration with the designated static IP enables secure communication via session initiation protocol (SIP), remote access, a decoy obfuscation tool, and a virtual dissimulated encrypted server.

Figure 3:
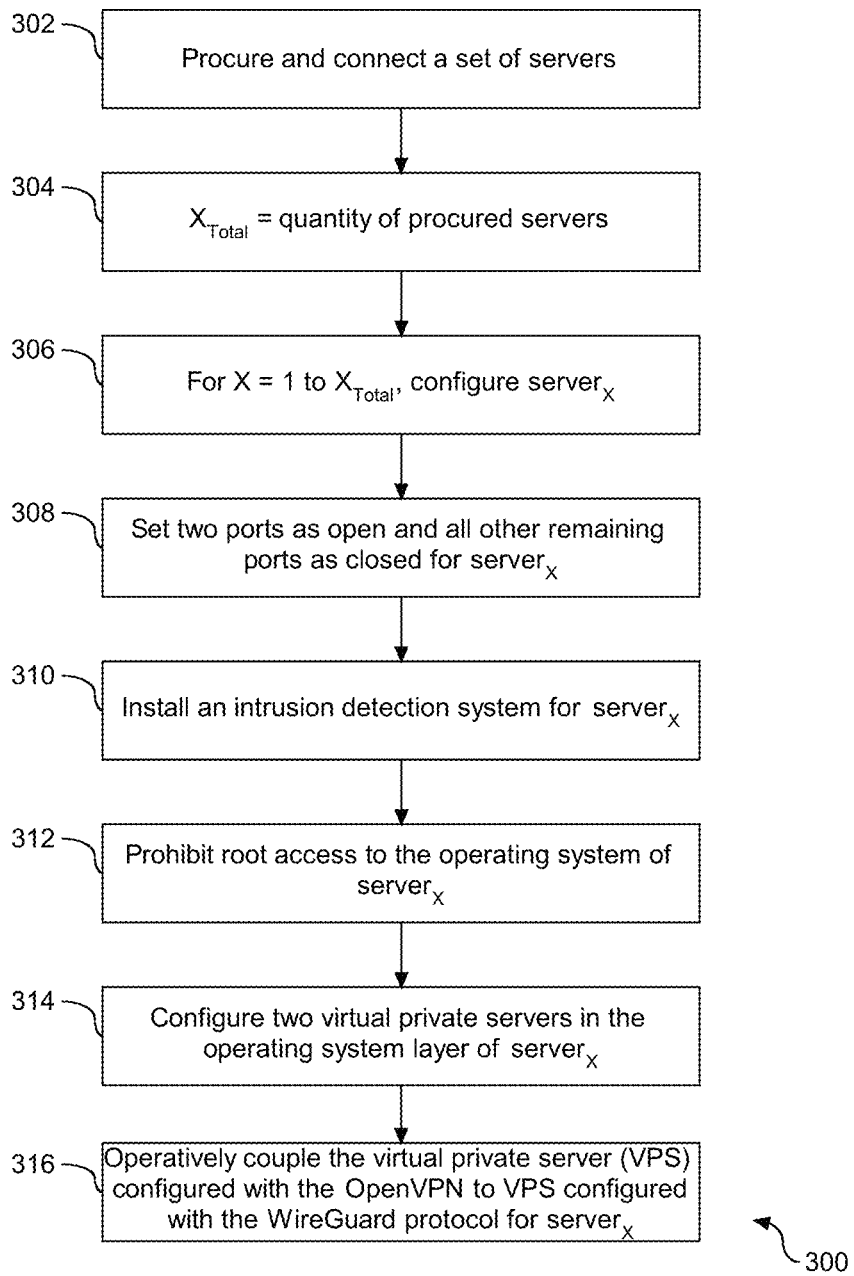
FIG. 3 illustrates a flow chart for configuring the network of physical and virtual servers, as shown in FIGS. 1 and 2.

Referring to FIG. 3, a flow chart (300) is provided to illustrate configuring the network of physical and virtual servers, as shown in FIGS. 1 and 2. A set of servers are procured and operatively and serially connected (302). In an exemplary embodiment, a minimum of three servers are procured and connected, and preferably a minimum of five servers. The variable $X_{Total}$ is assigned to the quantity of procured servers (304). For each procured server (306), from X=1 to $X_{Total}$, the following steps demonstrates configuration of the individual servers: two ports are set as open, and all other remaining ports are closed or otherwise disabled (308), an intrusion detection system is installed (310), root access to the operating system is prohibited (312), and two virtual private servers are configured in the operating system layer of server$_X$, with one VPS configured with an OpenVPN protocol to generate a corresponding OpenVPN certificate, and one VPS configured with a WireGuard protocol to generate a WireGuard VPN certificate (314). In an exemplary embodiment and as shown and described in FIG. 1, the two ports set as open are ports 443 and 1999. Within each server$_X$, the VPS configured with the OpenVPN protocol is operatively coupled via a private and unencrypted IP scheme to the VPS configured with the WireGuard protocol (316). This operative coupling establishes a unilateral connection from the VPS configured with the OpenVPN protocol to the VPS configured with the WireGuard protocol, with the unilateral connection utilizing a private IP scheme, e.g. 192.x.x.x.

The configuration of the network of physical and virtual servers, as shown and described in FIG. 1-3, is utilized to encrypt communication through creation of a virtual private network (VPN) behind a VPS. Referring to FIG. 4, a flow chart (400) is provided to illustrate configuring a VPN behind a VPS. A network of physical servers is configured (402) with the configuration protocols shown and described in FIG. 3. The variable $X_{Total}$ is assigned to the quantity of servers in the network (404). A client machine, hereinafter referred to as a client is operatively coupled to the network of servers (406), after which each of the servers from X=1 to $X_{Total}$ generates and sends an OpenVPN certificate to the client machine (408). As shown and described in FIG. 3, each server is configured with a first VPS and a second VPS, with the first VPS configured with the OpenVPN protocol and configured to generate a corresponding VPN certificate and the second VPS configured with the WireGuard protocol and configured to generate a WireGuard certificate. The client receives and installs an OpenVPN certificate received from the first VPS, e.g. the VPS configured with the OpenVPN protocol, of the entry server (410). A request for data is initiated by the client machine through selection of one of the received OpenVPN certificate, and the client initiates a uni-directional encrypted communication tunnel to connect with the first VPS of the entry server (412). In support of the request to serve data, the client connects to the entry server via the uni-directional OpenVPN encrypted tunnel, and more specifically the first VPS of the entry server via port 443. The first VPS of the entry server directs the request across the internal communication tunnel, e.g. (126), to the second VPS of the entry server (414). The internal communication tunnel (126) employs the second port, e.g. port 8080, on a private IP scheme 10.x.x.x, which is not visible from outside the server. Within the entry server, or in an embodiment each of the servers in the network, a corresponding configuration file (not shown) is set to force all traffic through a specific domain name server (DNS) resolution, e.g. DNS 1.1.1.1, which prohibits traffic for any other DNS resolution, thereby forcing all traffic through the specific DNS resolution.

The second VPS in the entry server establishes connectivity to one of the other servers in the network, with these servers referred to as transit servers (416). In an embodiment, the randomizer local to the second VPS of the entry server randomizes a path to a transit server via a corresponding public IP address and generates an encrypted tunnel to the second VPS of the randomized transit server. In an exemplary embodiment, the randomizer ensures that the transit server is a network server and is not the entry server, or in an embodiment a previously designated transit server in support of the request. See FIG. 2 and the example WireGuard protocol tunnel (296) from the entry server (230) to the transit server (250). The connection formed at step (416) is established with the WireGuard protocol, and are hereinafter referred to as WireGuard encrypted tunnel(s). In an embodiment, the WireGuard encrypted tunnel is uni-directional from the WireGuard VPS of the entry server to the WireGuard VPS of the transit server. In an exemplary embodiment, the encrypted tunnel formed at step (416) is uni-directional to direct the request, or in an embodiment traffic associated with the request, from the second VPS of the entry server to the second VPS of the transit server. The tunnel formed at step (416) is via port 8080. Port 8080 is not visible from the outside; port 8080 is used by the second VPSs, also known as a WireGuard servers, in each of the physical servers, to enable the WireGuard servers to communication internally between them on a corresponding sub-network, also referred to herein as a Subnet. In an exemplary embodiment, the private IP scheme at step (416) is 10.80.x.x. Accordingly, the randomizer generates an encrypted tunnel to the transit node, or in an embodiment between transit nodes, for each request.

The transit server may process the received request, or in an embodiment, the transit server may function as an interface between the entry server and a second transit server. As demonstrated, following step (416) is it determined if the transit server is configured or designated to process the request (418). A negative response to the decision at step (418) is followed by a return to step (416) directed at designating a subsequent transit server and establishing a subsequent WireGuard protocol tunnel between the transit server and the subsequent transit server. In an exemplary embodiment, the quantity of transit servers to support the client request is configurable. A positive response to the decision at step (418) is followed by the transit server functioning as an exit server and forming a WireGuard encrypted tunnel from the exit server to a public network, e.g. Internet, to obtain data in support of the request, and extending the formed WireGuard encrypted tunnel to the client machine (420). Accordingly, an OpenVPN communication tunnel is established to support receipt of a request from a client machine to a server network, and a WireGuard communication tunnel is established to support processing the request and communicating data in support of the request from the server network to the client machine.

The request may be transient, or in an embodiment it may be static. As shown herein by way of example, a determination is made whether the request is static (422). In an exemplary embodiment, the static designation may take place through action, or in an embodiment inaction. A positive response to the determination is followed by maintaining the encrypted communication tunnels formed from the exit server to the client (424), including the OpenVPN encrypted tunnels and the WireGuard encrypted tunnel(s). As long as the encrypted tunnels are maintained, client request data may be tunneled through the tunnels. In an exemplary embodiment, at step (424) the static connection enables data in support of the request to be streamed on a dual encryption network to a known location. The streaming is dual encryption due to the fact that the client request is processed across two encrypted tunnels, including a first tunnel encrypted with the OpenVPN protocol between the client and one of the servers, e.g. entry server, and a second encrypted tunnel with the WireGuard protocol to serve data to the client from a server designated as an exit server. The static connection enables a secure connection via session initiation protocol (SIP), remote access, a decoy obfuscation tool, and a virtual dissimulated encrypted server. A negative response to the determination at step (422) indicates that the request is transient. Similar to step (424), a data request is supported through the formed encrypted communication tunnels, followed by termination of the communication tunnels (426). The tunnels formed and utilized to support the request at step (426) are referred to as transient, and after the requested data is provided to the client the tunnels expire. Accordingly, the process shown and described herein is directed at building a dual encryption network to enable transmission of secure communications.

Figure 5:
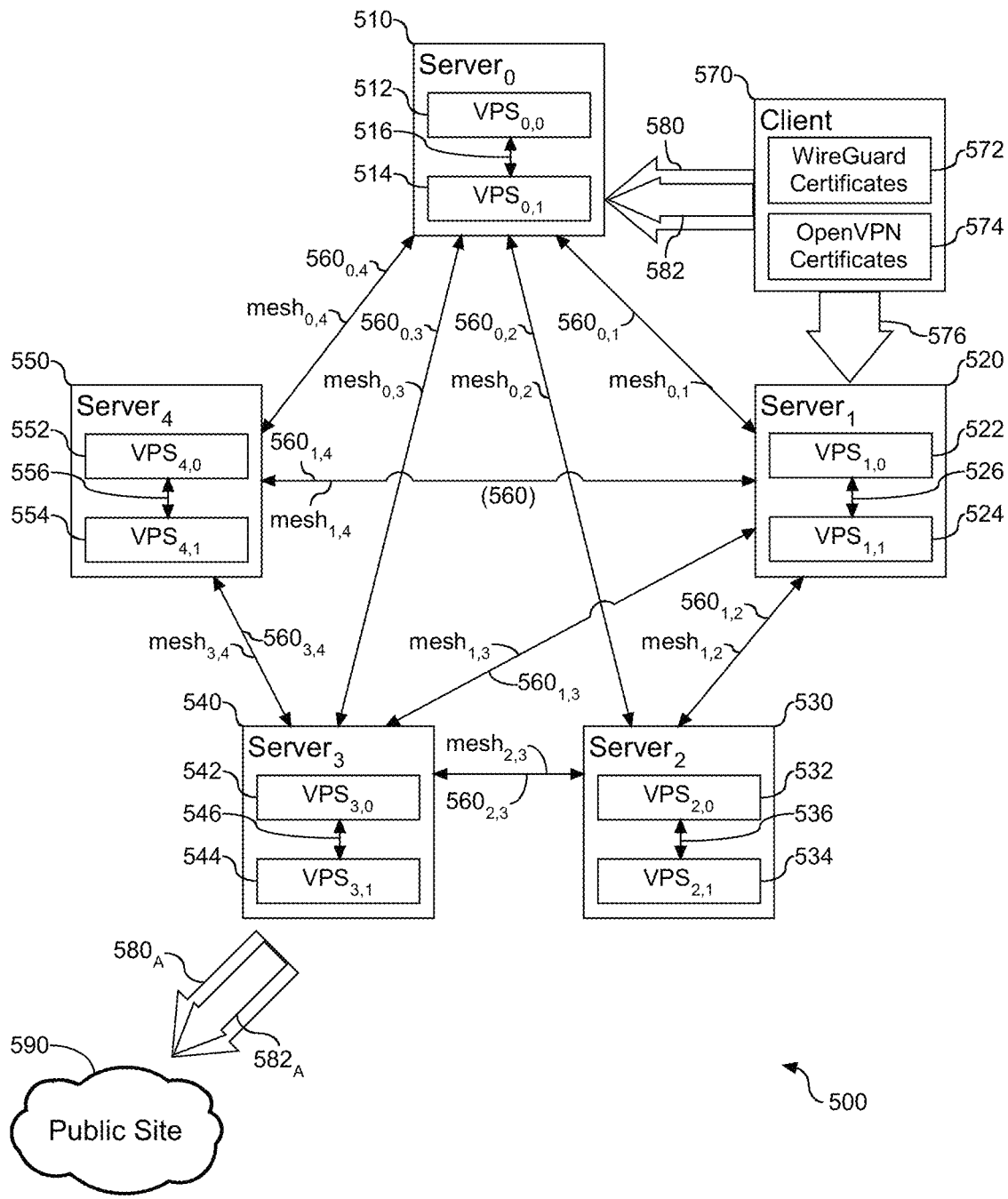
FIG. 5 illustrates a diagram of a computer system with multiple servers operatively coupled to a client machine, with the servers configured to support and enable data encryption and routing of data through the use two or more VPNs, and more specifically to configure a first VPN inside a second VPN.

Referring to FIG. 5, a diagram of computer system (500) is provided to illustrate multiple servers operatively coupled to a client machine, with the servers configured to support and enable data encryption and routing of data through the use two or more VPNs, and more specifically to configure a first VPN inside a second VPN. As shown in this example, there are five servers, shown herein as server$_0$ (510), server$_1$ (520), server$_2$ (530), server$_3$ (540), and server$_4$ (550). Although five servers are shown, the quantity should not be considered limiting. Each of the servers is configured with the hardware and operating system layers and settings as shown in FIG. 1. The O/S layer of each server is provided with two virtual private servers (VPS). As shown herein, server$_0$ (510) is shown with VPS$_{0,0}$ (512) and VPS$_{0,1}$ (514), server$_1$ (520) is shown with VPS$_{1,0}$ (522) and VPS$_{1,1}$ (524), server$_2$ (530) is shown with VPS$_{2,0}$ (532) and VPS$_{2,1}$ (534), server$_3$ (540) is shown with VPS$_{3,0}$ (542) and VPS$_{3,1}$ (544), and server$_4$ (550) is shown with VPS$_{4,0}$ (552) and VPS$_{4,1}$ (554). Within each of the physical servers, the respective VPS's are operatively coupled, as shown at (516), (526), (536), (546), and (556), respectively. Each VPS is configured to generate a corresponding VPN certificate. In an embodiment, each of VPS$_{0,0}$ (512), VPS$_{1,0}$ (522), VPS$_{3,0}$ (532), VPS$_{4,0}$ (542), and VPS$_{5,0}$ (552) is referred to individually as a first VPS, and each of VPS$_{0,1}$ (514), VPS$_{1,1}$ (524), VPS$_{2,1}$ (534), VPS$_{3,1}$ (544), and VPS$_{3,1}$ (554) is referred to individually as a second VPS or a WireGuard server. As shown herein, each of VPS$_{0,0}$ (512), VPS$_{1,0}$ (522), VPS$_{3,0}$ (532), VPS$_{4,0}$ (542), and VPS$_{5,0}$ (552) is individually configured to generate an OpenVPN certificate, and each of VPS$_{0,1}$ (514), VPS$_{1,1}$ (524), VPS$_{2,1}$ (534), VPS$_{3,1}$ (544), and VPS$_{3,1}$ (554) is individually configured to generate a WireGuard VPN certificate.

In response to a client machine, shown herein as client (570) requesting data from an identified or selected server, a mesh network connection based on the WireGuard protocol between all of the servers is created. As shown herein, the client (570) selects a WireGuard certificate associated with server$_1$ (520), and sets up an initial WireGuard encrypted communication tunnel (576). The mesh network (560) is constructed in response to the client (570) selecting one of the servers to support a data request, with that server designated as an entry server. The mesh network establishes an inter-connection of the servers in which there are two pathways to each server. In an exemplary embodiment, if one of the pathways fails, a second pathway remains available. The mesh network (560) shown herein is represented by multi bi-lateral interconnections at mesh$_{0,1}$ (560$_{0,1}$), mesh$_{0,2}$ (560$_{0,2}$), mesh$_{0,3}$ (560$_{0,3}$), mesh$_{0,4}$ (560$_{0,4}$), mesh$_{1,2}$ (560$_{1,2}$), mesh$_{1,3}$ (560$_{1,3}$), mesh$_{1,4}$ (560$_{1,4}$), mesh$_{2,3}$ (560$_{2,3}$), and mesh$_{3,4}$ (560$_{3,4}$). The mesh network (560) establishes a permanent mesh network connection based on the WireGuard protocol on a network interface via a private IP scheme. The mesh network (560) enables the servers to be inter-connected with no DNS resolution and no Internet connectivity, which in an exemplary embodiment is established with one or more configuration settings. In an exemplary embodiment, the configuration settings are configured in each second VPS, also referred to herein as a second VPN server, shown as (514), (524), (534), (544), and (554) in FIG. 5, within the operating system layer. The mesh network functionality setting is configured in each second VPS, e.g. (514), (524), (534), (544), and (554), within the operating system. In an exemplary embodiment, each second VPS, e.g. (514), (524), (534), (544), and (554), has a corresponding WireGuard interface (not shown) and in conjunction with IP table rules enables and supports internal communication with each other second VPN server via port 8080. Accordingly, in the example shown herein, server$_1$ (520) is a manually chosen entry server over the WireGuard certificate to initiate the building of the mesh WireGuard network (560) between all the servers.

Each server in the mesh network (560) generates VPN certificates on both the OpenVPN protocol and the WireGuard protocol. These certificates are forwarded to one or more client machines. In the example shown herein, client (570) is in receipt of multiple VPN certificates on both protocols, WireGuard and OpenVPN, with the OpenVPN certificates collectively shown herein as (574), received from each server, and more specifically, VPS$_{0,0}$ (512), VPS$_{1,0}$ (522), VPS$_{3,0}$ (532), VPS$_{4,0}$ (542), and VPS$_{5,0}$ (552), and is also in receipt of multiple WireGuard certificates, collectively shown herein as (572), received from each server, and more specifically, VPS$_{0,1}$ (514), VPS$_{1,1}$ (524), VPS$_{2,1}$ (534), VPS$_{3,1}$ (544), and VPS$_{3,1}$ (554). To establish connection to the network of servers, the client (570) designates an entry server by selection of one WireGuard certificate and then designates an exit server by selection of one OpenVPN certificate from among the received OpenVPN and WireGuard certificates. In the example shown herein, the entry server is shown as server$_1$ (520) and the exit server is shown as server$_0$ (510). In an exemplary embodiment, the entry server is different from the exit server. Similarly, in an embodiment, the randomizer embedded in the entry server, as shown in FIG. 1, is utilized to designate the exit server. An encrypted WireGuard tunnel (580) is shown herein as a uni-directional tunnel on an assigned second network interface, and as shown connects the client (570) with the exit server (510). In an embodiment, the tunnel (580) is established on a different WireGuard certificate than that used to form and support the mesh network. As shown herein by way of example, VPS$_{0,1}$ (514) generates a first WireGuard certificate to support the mesh network, and generates a second WireGuard certificate to support tunnel (580). The OpenVPN certificate designating exit server (510) is configured with a private IP on the same subnet as the second interface on WireGuard. As shown herein, the OpenVPN connection is activated and creates an encrypted tunnel (582) inside the WireGuard tunnel (580), thereby creating an encrypted OpenVPN communication tunnel within an encrypted WireGuard communication tunnel. In an embodiment, the encrypted tunnel (580) is a uni-directional communication tunnel configured to transmit data from the client (570) to the exit server (510). The encrypted tunnel (582) is a bi-directional communication tunnel enabling data request from the Internet and data reply to the client device. The tunnels (580) and (582) function to support a data request from the client (570). As shown, a second WireGuard encrypted tunnel (580$_A$) is established between the mesh network (560) and a public site (590), e.g. Internet, and a second OpenVPN encrypted tunnel (582$_A$) is formed within the second WireGuard encrypted tunnel (580$_A$). In an embodiment, tunnel (580$_A$) is uni-directional and tunnel (582$_A$) is bi-directional. Data received from the public site in support of the request is communicated across the OpenVPN tunnel (582$_A$) to the mesh network (560), and from the mesh network to the second VPS, e.g. VPS$_{0,1}$ (514), of the exit server (510). The second VPS, e.g. VPS$_{0,1}$ (514), communicates or transfers the data across an internal tunnel to the first VPS, e.g. VPS$_{0,0}$ (512), of the exit server (510). The first VPS (512) directs the data across the first OpenVPN tunnel (582) within the first WireGuard tunnel (580) formed with the client machine (570). Accordingly, a set of dual encryption mechanisms are formed in conjunction with the mesh network to obfuscate data in support of a request.

Figure 6:
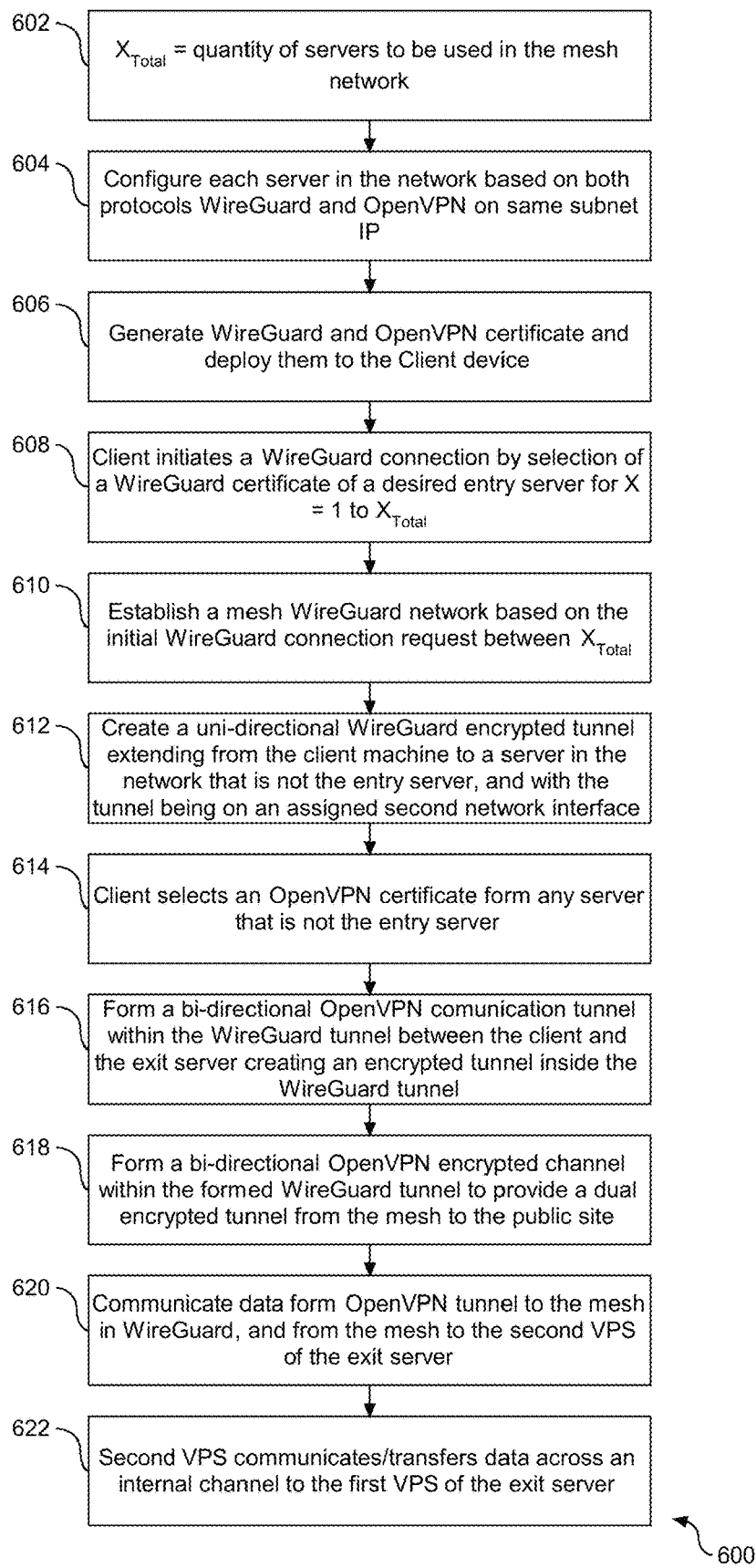
FIG. 6 illustrates a flow chart for creating a VPN tunnel inside a VPN tunnel, as shown in FIG. 5.

Referring to FIG. 6, a flow chart (600) is provided to illustrate the process of creating a VPN tunnel inside a VPN tunnel, as shown in FIG. 5. The variable $X_{Total}$ is assigned to the quantity of servers to be used in forming the mesh network (602). Each of the servers is configured with a first VPS and a second VPS in the operating system layer, as shown and described in FIG. 1. More specifically, each server in the network is configured on both OpenVPN and WireGuard protocols on the same subnet IP (604). In an exemplary embodiment, there is a minimum of five servers to be used in forming the mesh network, although this quantity should not be considered limiting. Each server generates both a WireGuard certificate and an OpenVPN certificate and deploys the generated certificates to an operatively coupled client machine (606) so that the client machine is configured with both OpenVPN and WireGuard certificates in support of a data request. An initial step or stage of the data request is for the client machine to initiate a WireGuard connection to a desired or selected entry server, e.g. from X=1 to $X_{Total}$, in support of a data request by selection of one of the received WireGuard certificates (608). In an embodiment, the client selects the entry server, with the selection either being designated or random. The initiation of the WireGuard connection with the entry server at step (608) forms an encrypted WireGuard tunnel between the client and the entry server. Following step (608) a mesh WireGuard network is established, with the mesh network based on the WireGuard VPN protocol on a first network interface via a private IP scheme between all of the servers, e.g. from X=1 to $X_{Total}$, (610). The mesh network built at step (610) has no DNS resolution and no public network connectivity, e.g. Internet. In an exemplary embodiment, the mesh network is permanent in that once the mesh network is established via WireGuard, the servers will always communicate between them until the mesh network is shut down. Using the mesh network, the servers can only communicate between each other via a private IP scheme with no Internet access or DNS resolution. Accordingly, the mesh network formed at step (610) functions as a first layer of encryption.

Following step (610) and the formation of the mesh network, a uni-directional WireGuard encrypted tunnel is created, with the tunnel extending from the client machine to a server in the network that is not the entry server, and with the tunnel being on an assigned second network interface (612). In an embodiment, the tunnel formed at step (612) is established on a different WireGuard certificate than that used to form and support the mesh network. The WireGuard certificate enabled by the client is different from the built WireGuard mesh network. By enabling the WireGuard certificate, the server assigns a second network interface on the WireGuard protocol with DNS resolution and a public IP address, and an encrypted WireGuard tunnel is formed between the client and the exit server on the second network interface. The server associated with the WireGuard tunnel formed at step (612) is referred to herein as the exit server. Following step (612), the client machine selects an OpenVPN certificate associated with the exit server (614) and forms a bi-directional OpenVPN communication tunnel within the WireGuard tunnel between the client and the exit server thereby creating an encrypted tunnel bi-directional OpenVPN tunnel inside the WireGuard tunnel (616). The exit server is designated to process the client request. As shown, following step (616), the exit server forms a WireGuard encrypted tunnel that extends from the mesh network to a public site to obtain data, and forms a bi-directional OpenVPN encrypted tunnel within the formed WireGuard tunnel to provide a dual encrypted tunnel from the mesh to the public site (618). Data in support of the request is communication from the formed OpenVPN tunnel to the mesh in WireGuard, and from the mesh to the second VPS of the exit server (620). The second VPS of the exit server communicates or transfers data across an internal tunnel to the first VPS of the exit server, and the first VPS directs the request across the OpenVPN tunnel within the WireGuard tunnel formed with the client machine (622).

Figure 7:
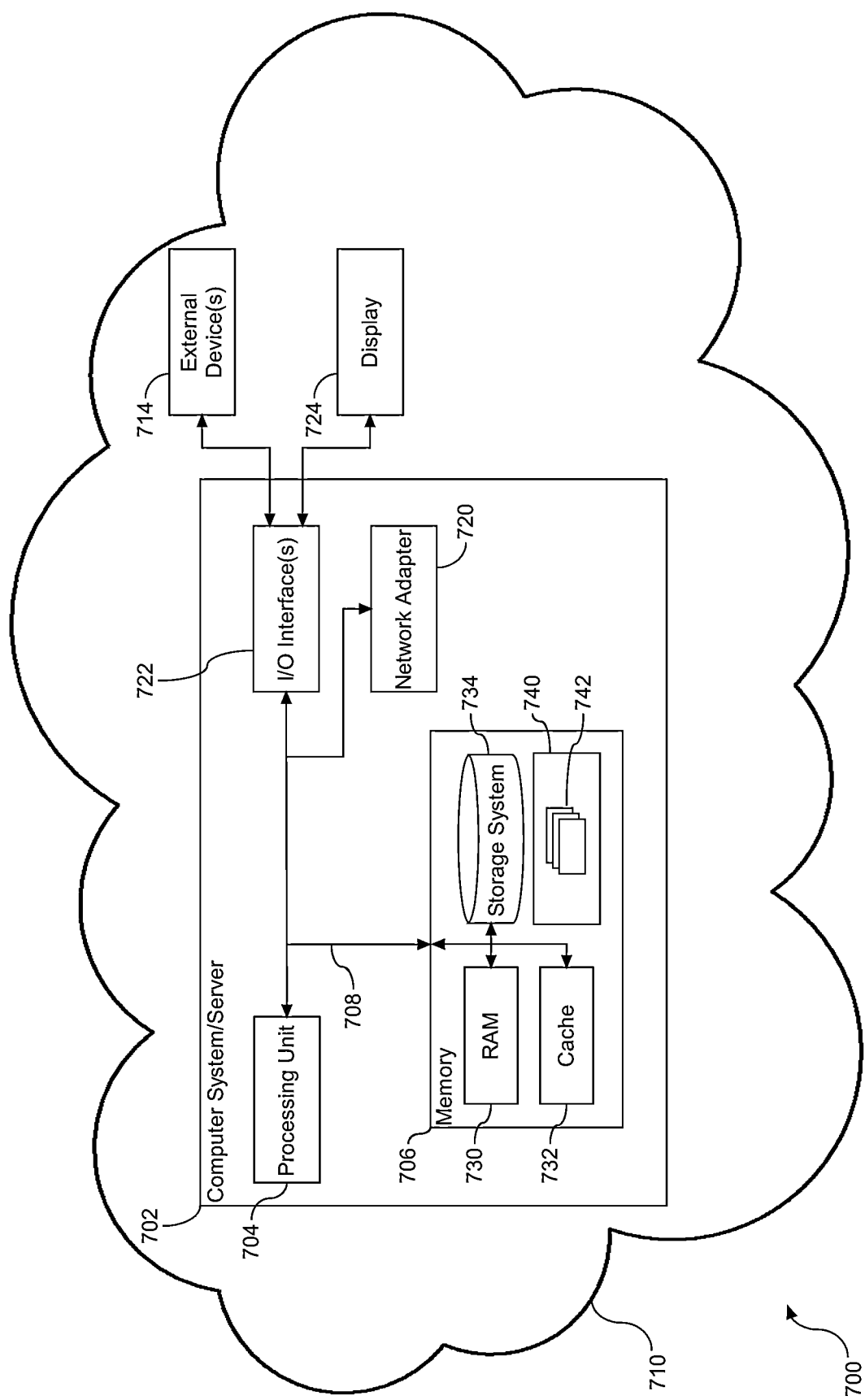
FIG. 7 illustrates a block diagram depicting an example of a computer system/server of a cloud based support system, to implement the system and processes described above with respect to FIGS. 1-6.

In an exemplary embodiment, aspects of the form and function of the VPN structures shown herein and their associated functionality may be embodied in a computer system with a plurality of distributed servers. For example, the servers may be distributed across a cloud-based system. With reference to FIG. 7, a block diagram (700) is provided illustrating an example of a computer system/server (702), hereinafter referred to as a host (702) in communication with a cloud-based support system, to implement the systems and processes described above with respect to FIGS. 1-6. Host (702) is operational with numerous other general purpose or special purpose computing system environments or configurations. Examples of well-known computing systems, environments, and/or configurations that may be suitable for use with host (702) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (702) may be described in the general context of computer system-executable instructions, such as program modules, being executed by a computer system. Generally, program modules may include routines, programs, objects, components, logic, data structures, and so on that perform particular tasks or implement particular abstract data types. Host (702) may be practiced in distributed cloud computing environments (710) where tasks are performed by remote processing devices that are linked through a communications network. In a distributed cloud computing environment, program modules may be located in both local and remote computer system storage media including memory storage devices.

As shown in FIG. 7, host (702) is shown in the form of a general-purpose computing device, with the hardware and operating system layers and configuration as shown in FIG. 1. The components of host (702) may include, but are not limited to, one or more processors or processing units (704), e.g. hardware processors, a system memory (706), and a bus (708) that couples various system components including system memory (706) to processing unit (704). Bus (708) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (702) typically includes a variety of computer system readable media. Such media may be any available media that is accessible by host (702) and it includes both volatile and non-volatile media, removable and non-removable media.

Memory (706) can include computer system readable media in the form of volatile memory, such as random access memory (RAM) (730) and/or cache memory (732). By way of example only, storage system (734) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (708) by one or more data media interfaces.

Program/utility (740), having a set (at least one) of program modules (742), may be stored in memory (706) by way of example, and not limitation, as well as one or more application programs, other program modules, and program data. Each of the one or more application programs, other program modules, and program data or some combination thereof, may include an implementation of a networking environment. Program modules (742) generally carry out the functions and/or methodologies of embodiments to assess and manage provisioning of the OpenVPN and WireGuard encrypted communication tunnels in a distributed resource environment. For example, the set of program modules (742) may include tools to support and enable random selection of servers and their corresponding functionality, such as entry, transit, and exit server designations, designation of a connection to remain static so that traffic is only generated from a particular IP address, creation of a mesh network, etc.

Host (702) may also communicate with one or more external devices (714), such as a keyboard, a pointing device, etc.; a display (724); one or more devices that enable a user to interact with host (702); and/or any devices (e.g., network card, modem, etc.) that enable host (702) to communicate with one or more other computing devices. Such communication can occur via Input/Output (I/O) interface(s) (722). Still yet, host (702) can communicate with one or more networks such as a local area network (LAN), a general wide area network (WAN), and/or a public network (e.g., the Internet) via network adapter (720). As depicted, network adapter (720) communicates with the other components of host (702) via bus (708). In one embodiment, a plurality of servers, e.g. nodes, is in communication with the host (702) via the I/O interface (722) or via the network adapter (720). It should be understood that although not shown, other hardware and/or software components could be used in conjunction with host (702). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (706), including RAM (730), cache (732), and storage system (734), such as a removable storage drive and a hard disk installed in a hard disk drive.

Computer programs (also called computer control logic) are stored in memory (706). Computer programs may also be received via a communication interface, such as network adapter (720). Such computer programs, when run, enable the computer system to perform the features of the present embodiments as discussed herein. In particular, the computer programs, when run, enable the processing unit (704) to perform the features of the computer system. Accordingly, such computer programs represent controllers of the computer system.

In one embodiment, host (702) is a node of a cloud computing environment. The host (702) is configured to communicate with other servers in the environment, and to create a dual obfuscated network to interface with a client machine in support of a request. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 8:
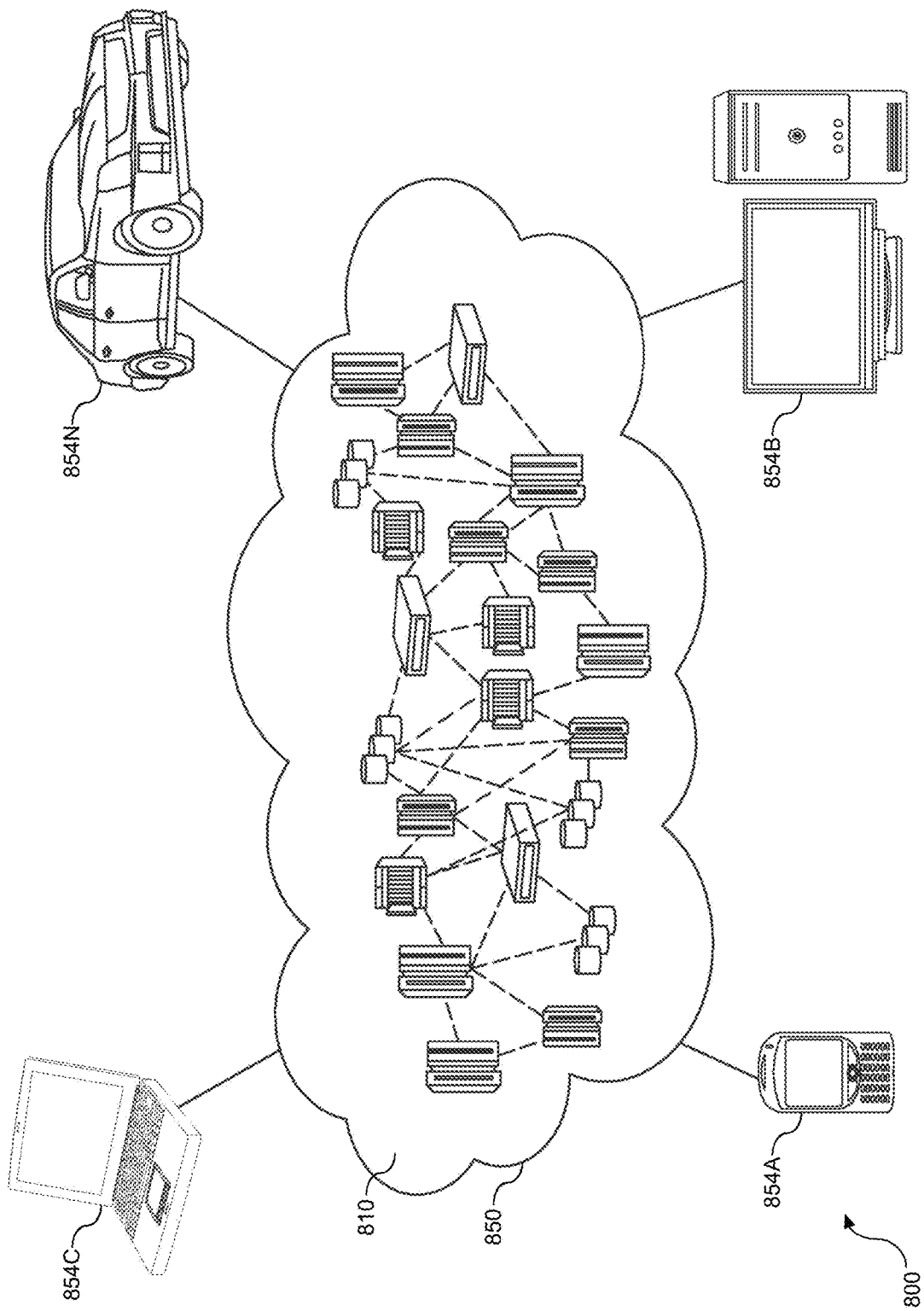
FIG. 8 illustrates a block diagram depicting a cloud computer environment.

Referring now to FIG. 8, an illustrative cloud computing network (800). As shown, cloud computing network (800) includes a cloud computing environment (850) having one or more cloud computing nodes (810) with which local computing devices used by cloud consumers may communicate. Examples of these local computing devices include, but are not limited to, personal digital assistant (PDA) or cellular telephone (854A), desktop computer (854B), laptop computer (854C), and/or automobile computer system (854N). Individual nodes within nodes (810) may further communicate with one another. They may be grouped (not shown) physically or virtually, in one or more networks, such as Private, Community, Public, or Hybrid clouds as described hereinabove, or a combination thereof. This allows cloud computing environment (800) to offer infrastructure, platforms and/or software as services for which a cloud consumer does not need to maintain resources on a local computing device. It is understood that the types of computing devices (854A-N) shown in FIG. 8 are intended to be illustrative only and that the cloud computing environment (850) can communicate with any type of computerized device over any type of network and/or network addressable connection (e.g., using a web browser).

Figure 9:
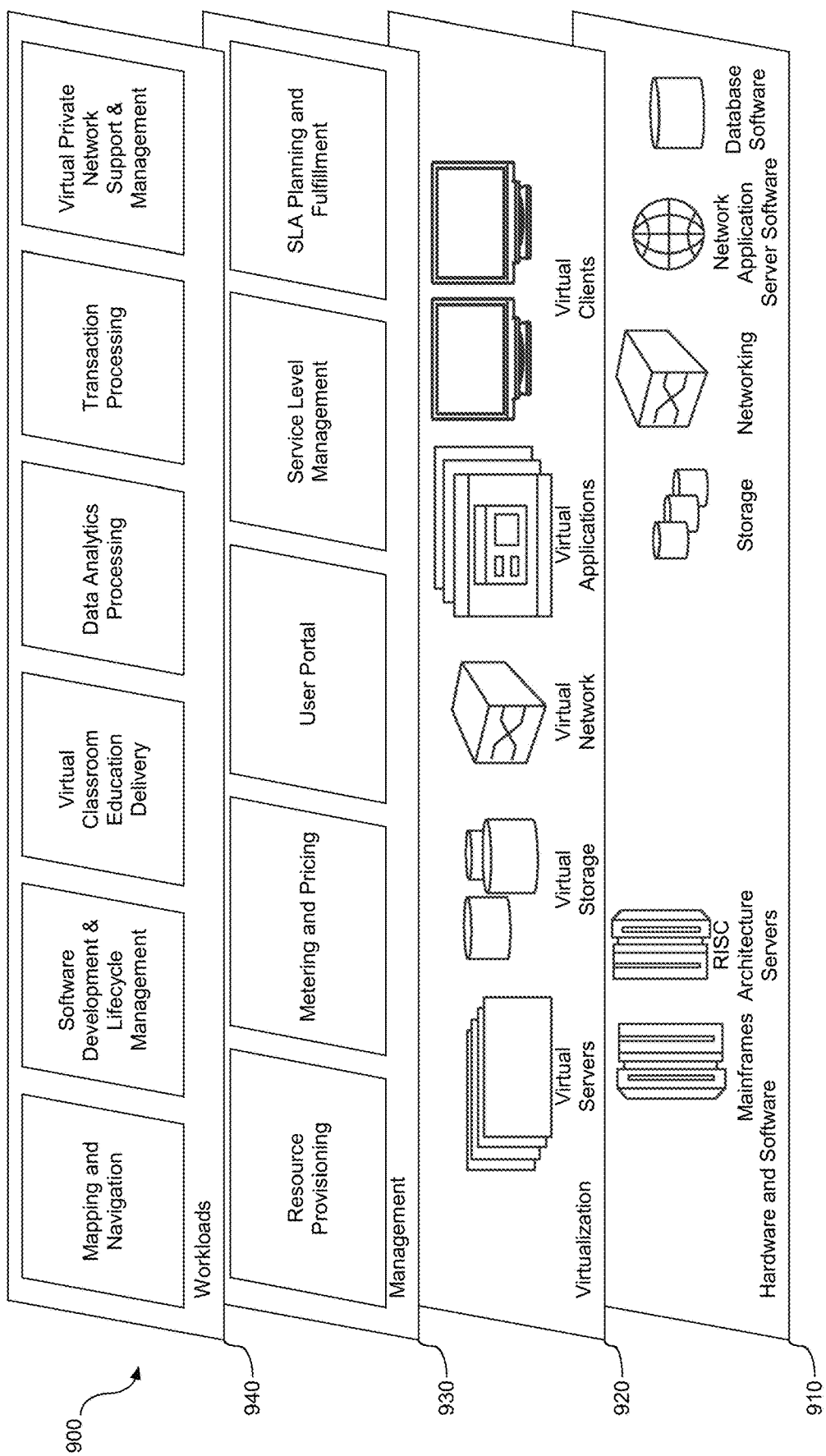
FIG. 9 illustrates a block diagram depicting a set of functional abstraction model layers provided by the cloud computing environment.

Referring now to FIG. 9, a set of functional abstraction layers (800) provided by the cloud computing network of FIG. 8 is shown. It should be understood in advance that the components, layers, and functions shown in FIG. 9 are intended to be illustrative only, and the embodiments are not limited thereto. As depicted, the following layers and corresponding functions are provided: hardware and software layer (910), virtualization layer (920), management layer (930), and workload layer (940).

The hardware and software layer (910) includes hardware and software components. Examples of hardware components include physical servers, storage devices, networks and networking components. Examples of software components include network application server software.

Virtualization layer (920) provides an abstraction layer from which the following examples of virtual entities may be provided: virtual servers; virtual storage; virtual networks, including virtual private networks; virtual applications and operating systems; and virtual clients.

In one example, management layer (930) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (940) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and virtual private network support and management.

While particular embodiments of the present embodiments have been shown and described, it will be obvious to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles.

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, a method, and/or a computer program product are operative to support the functionality and operation of a dual obfuscated network configuration.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown and described herein, communication traffic from the first VPS to the second VPS is established via a private IP scheme, e.g. 192.x.x.x. The communication traffic from the second VPS to the transit servers, also referred to herein as transit nodes, is established via a different private IP scheme, e.g. 10.x.x.x. This schema of traffic flow incorporates two different subnets IP as an extra layer of security. It will be appreciated that, although specific embodiments have been described herein for purposes of illustration, various modifications may be made without departing from the spirit and scope of the embodiments. In particular, configuration of the dual obfuscated network may be carried out by different computing platforms or across multiple devices. Accordingly, the scope of protection of the embodiments is limited only by the following claims and their equivalents.

What is claimed is:

1. A computer system comprising:
   a first server having a hardware layer with one or more hardware resources and an operating system (OS) layer;
   the operating system layer operatively coupled to the hardware layer, the operating system comprising:
   a first virtual private server (VPS) configured with OpenVPN protocol, the first VPS configured to generate an OpenVPN certificate configured to support a first communication tunnel with a secondary source, the first communication tunnel encrypted with the OpenVPN protocol; and
   a second VPS operatively coupled to the first VPS via a private internet protocol (IP) scheme, the second VPS configured with WireGuard protocol configured to generate a WireGuard certificate, the second VPS configured to spawn a second communication tunnel encrypted with the WireGuard protocol; and
   the first server configured to receive a communication from the secondary source to initiate a virtual private network connection, the received communication configured to initiate the first communication tunnel to the first VPS, the first VPS configured to forward the received communication to the second VPS on a first private IP scheme, and the second VPS configured to initiate the second communication tunnel to a second server on a second private IP scheme different from the first private IP scheme.

2. The computer system of claim 1, further comprising the hardware layer configured with only two ports open and all other ports closed, wherein a first of the open ports establishes the first communication tunnel and a second of the open ports establishes the second communication tunnel.

3. The computer system of claim 2, wherein the first port is port 443 and the second port is port 8080, and the first and second private IP schemes configured to utilize the second port.

4. The computer system of claim 2, further comprising the first server operatively coupled to two or more second servers, including:
   each of the two or more second servers including corresponding hardware and operating system layers, the operating system layers configured with corresponding first VPS and second VPS, with each first VPS configured with the Open VPN protocol and each second VPS configured with the WireGuard protocol.

5. The computer system of claim 4, further comprising a randomization algorithm to interface with the initiation of the second communication tunnel to randomly select distribution of traffic to one of the two or more second servers.

6. The computer system of claim 1, wherein the first and second communication tunnels create a dual obfuscated network configured to stream data until at least one of the first and second communication tunnels is disengaged.

7. The computer system of claim 4, wherein one of the two or more second servers is a transit server configured to select an exit server from among the servers in the network that is not an entry server, the transit server configured to generate a third communication tunnel between the entry server and the exit server, the third communication tunnel being a WireGuard encrypted tunnel, and the exit server configured to generate a fourth communication tunnel to the secondary device, the fourth communication tunnel being encrypted with the Open VPN protocol.

8. The computer system of claim 7, wherein received communication traffic is directed to the exit server via a second IP scheme, different from the first IP scheme, and on the second port.

9. A computer system comprising:
a first server operatively coupled to a second server and a third server, each of the first, second, and third servers having a hardware layer with one or more hardware resources and an operatively coupled operating system (OS) layer;
each server operating system layer comprising:
a first virtual private server (VPS) configured with OpenVPN protocol, the first VPS configured to generate an OpenVPN certificate and to support a first communication tunnel with a secondary source, the first communication tunnel encrypted with the Open VPN protocol; and
a second VPS operatively coupled to the first VPS via a private internet protocol (IP) scheme, the second VPS configured with WireGuard protocol to generate a WireGuard certificate, the second VPS configured to spawn a second communication tunnel encrypted with the WireGuard protocol; and
the first server configured to receive a communication from the secondary source to initiate a virtual private network connection, the received communication configured to initiate the first communication tunnel to the first VPS, the first VPS configured to forward the received communication to the second VPS on a first private IP scheme, and the second VPS configured to initiate the second communication tunnel to one of the second and third servers on a second private IP scheme different from the first private IP scheme.

10. The computer system of claim 9, wherein each server hardware layer is configured with only two ports open and all other ports closed, a first of the open ports establishes the first communication tunnel and a second of the open ports establishes the second communication tunnel.

11. The computer system of claim 10, wherein the first port is port 443 and the second port is port 8080, and the first and second private IP schemes configured to utilize the second port.

12. The computer system of claim 9, wherein each second VPS further comprises a randomization algorithm to interface with the initiation of the second communication tunnel to randomly select distribution of traffic to one of the second and third servers.

13. The computer system of claim 9, wherein the first and second communication tunnels create a dual obfuscated network configured to stream data until at least one of the first and second communication tunnels is disengaged.

14. The computer system of claim 9, wherein one of the second and third servers is a transit server configured to select an exit server from among the servers in the network that is not the first server, the transit server configured to generate a third communication tunnel between the first server and the exit server, the third communication tunnel being a WireGuard encrypted tunnel, and the exit server configured to generate a fourth communication tunnel to the secondary source, the fourth communication tunnel being encrypted with the Open VPN protocol.

15. The computer system of claim 9, wherein creation of the second communication tunnel further comprises the first VPS of each of the servers to establish a mesh network based on a WireGuard protocol on a network interface via a private IP scheme, wherein the mesh network has no DNS resolution and no internet activity.

16. The computer system of claim 15, further comprising the secondary source to select an exit server from among the servers through selection of an Open VPN certificate and a WireGuard certificate.

17. The computer system of claim 16, further comprising an initiation of a dual obfuscated network, the initiation including a first enablement of the selected WireGuard certificate on a first subnet IP and a second enablement of the selected Open VPN certificate on the first subnet IP.

18. The computer system of claim 17, wherein the first enablement of the selected WireGuard certificate creates a WireGuard encrypted communication tunnel from the secondary source to the first server, and the second enablement of the selected OpenVPN certificate establishes an Open VPN encrypted communication tunnel inside the WireGuard encrypted communication tunnel.

19. A computer implemented method, comprising:
providing a first server comprising:
a hardware layer with one or more hardware resources and an operating system (OS) layer; and
the operating system layer operatively coupled to the hardware layer, the operating system comprising:
a first virtual private server (VPS) configured with OpenVPN protocol, the first VPS configured to generate an OpenVPN certificate and to support a first communication tunnel from a secondary source, the first communication tunnel encrypted with the OpenVPN protocol; and
a second VPS operatively coupled to the first VPS via a private internet protocol (IP) scheme, the second VPS configured with WireGuard protocol configured to generate a WireGuard certificate, the second VPS configured to spawn a second communication tunnel encrypted with the WireGuard protocol; and
the first server receiving a communication from a secondary source device and initiating a virtual private network connection, the received communication initiating the first communication tunnel to the first VPS, the first VPS forwarding the received communication to the second VPS on a first private IP scheme, and the second VPS initiating the second communication tunnel to a second server on a second private IP scheme different from the first private IP scheme.

20. The computer implemented method of claim 19, further comprising configuring the hardware layer with only two ports open and all other ports closed, wherein a first of the open ports establishes the first communication tunnel and a second of the open ports establishes the second communication tunnel.

21. The computer implemented method of claim 20, further comprising operatively coupling the first server to two or more second servers, each of the two or more second servers including corresponding hardware and operating system layers, configuring the operating system layers with corresponding first VPS and second VPS, with each first VPS configured with the OpenVPN protocol and each second VPS configured with the WireGuard protocol.

22. The computer implemented method of claim 21, further comprising randomizing initiation of the second communication tunnel to randomly select distribution of traffic to one of the two or more second servers.

23. The computer implemented method of claim 22, wherein the first and second communication tunnels create a dual obfuscated network, and further comprising streaming data across the first and second communication tunnels until at least one of the first and second communication tunnels is disengaged.

24. The computer implemented method of claim 22, wherein one of the two or more second servers is a transit server, and further comprising the transit server selecting an exit server from among the servers in the network that is not an entry server and generating a third communication tunnel between the entry server and the exit server, the third communication tunnel being encrypted with the WireGuard protocol, and the exit server generating a fourth communication tunnel to the secondary source, the fourth communication tunnel being encrypted with the Open VPN protocol.

25. The computer implemented method of claim 24, further comprising directing received communication traffic to the exit server via the second private IP scheme, different from the first IP scheme, and on the second port.

26. A computer implemented method, comprising:
operatively coupling a first server to a second server and a third server, each of the first, second, and third servers having a hardware layer with one or more hardware resources and an operatively coupled operating system (OS) layer;
configuring each server operating system layer with a first virtual private server (VPS) and a second VPS, including configuring the first VPS with Open VPN protocol, the first VPS configured to generate an OpenVPN certificate and to support a first communication tunnel with a secondary source, the first communication tunnel encrypted with the OpenVPN protocol; and
operatively coupling the second VPS to the first VPS via a private internet protocol (IP) scheme, the second VPS configured with WireGuard protocol to generate a WireGuard certificate, the second VPS configured to spawn a second communication tunnel encrypted with the WireGuard protocol; and
initiating a private network connection, including initiating the first communication tunnel to the first VPS, the first VPS configured to forward the received communication to the second VPS on a first private IP scheme, and the second VPS initiating the second communication tunnel to one of the second and third servers on a second private IP scheme different from the first private IP scheme.

27. The computer implemented method of claim 26, wherein each server hardware layer is configured with only two ports open and all other ports closed, and further comprising a first of the open ports establishing the first communication tunnel and a second of the open ports establishing the second communication tunnel.

28. The computer implemented method of claim 27, wherein the first port is port 443 and the second port is port 8080, and the first and second private IP scheme configured to utilize the second port.

29. The computer implemented method of claim 26, wherein each second VPS further comprises a randomization algorithm to interface with the initiation of the second communication tunnel to randomly select distribution of traffic to one of the second and third servers.

30. The computer implemented method of claim 26, wherein the first and second communication tunnels create a dual obfuscated network, and further comprising streaming data across the tunnels of the dual obfuscated network until at least one of the first and second communication tunnels is disengaged.

31. The computer implemented method of claim 26, wherein one of the second and third servers is a transit server, and further comprising the transit server selecting an exit server from among the servers in the network that is not the first server, generating a third communication tunnel between the first server and the exit server, the third communication tunnel being encrypted with the WireGuard protocol, and generating a fourth communication tunnel to the secondary source, the fourth communication tunnel being encrypted with the Open VPN protocol.

32. The computer implemented method of claim 26, wherein creating of the second communication tunnel further comprises the first VPS of each of the servers establishing a mesh network based on the WireGuard protocol on a network interface via the second private IP scheme, wherein the mesh network has no DNS resolution and no internet activity.

33. The computer implemented method of claim 32, further comprising selecting an exit server from among the servers through selection of the OpenVPN certificate and the WireGuard certificate.

34. The computer implemented method of claim 33, further comprising initiating a dual obfuscated network, including a first enablement of the selected WireGuard certificate on a first subnet IP and a second enablement of the selected Open VPN certificate on the first subnet IP.

35. The computer implemented method of claim 34, wherein the first enablement of the selected WireGuard certificate creates a WireGuard encrypted communication tunnel from a secondary source to the first server, and the second enablement of the selected OpenVPN certificate establishes an OpenVPN encrypted communication tunnel inside the WireGuard encrypted communication tunnel.

* * * * *